United States Patent
Warren

(10) Patent No.: US 9,306,762 B2
(45) Date of Patent: Apr. 5, 2016

(54) REMOTE TALK DOWN TO PANEL, CAMERA AND SPEAKER

(71) Applicant: Vivint, Inc., Provo, UT (US)

(72) Inventor: Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 50 days.

(21) Appl. No.: 14/261,278

(22) Filed: Apr. 24, 2014

(65) Prior Publication Data

US 2015/0312050 A1 Oct. 29, 2015

(51) Int. Cl.
*H04N 7/14* (2006.01)
*H04L 12/28* (2006.01)

(52) U.S. Cl.
CPC ........ *H04L 12/2805* (2013.01); *H04L 12/2818* (2013.01)

(58) Field of Classification Search
CPC ..... G06Q 10/00; G06Q 20/00; G06Q 20/202; G06Q 30/0284; G06Q 50/30; H04N 7/186
USPC .......... 348/14.01, 14.02, 14.05, 14.07, 14.08, 348/14.1, 14.14, 14.04, 14.12
See application file for complete search history.

(56) References Cited

U.S. PATENT DOCUMENTS

| | | | |
|---|---|---|---|
| 7,962,305 B2 * | 6/2011 | Tiegs .................... | G06Q 10/00 348/14.01 |
| 8,350,694 B1 | 1/2013 | Trundle et al. | |
| 2005/0267605 A1 | 12/2005 | Lee et al. | |
| 2010/0195810 A1 * | 8/2010 | Mota et al. ............... | 379/167.12 |
| 2010/0245532 A1 * | 9/2010 | Kurtz .................. | G06K 9/00711 348/14.03 |
| 2010/0250345 A1 * | 9/2010 | Pratt et al. ........................ | 705/13 |
| 2011/0285863 A1 * | 11/2011 | Burke et al. ............... | 348/207.1 |
| 2011/0306325 A1 | 12/2011 | Gutta et al. | |
| 2011/0310247 A1 | 12/2011 | Rensin et al. | |
| 2012/0236156 A1 * | 9/2012 | Johnson ................. | H04S 7/301 348/181 |
| 2012/0282974 A1 | 11/2012 | Green et al. | |
| 2014/0070922 A1 * | 3/2014 | Davis ............................ | 340/6.1 |

OTHER PUBLICATIONS

International Search Report and Written Opinion of the International Searching Authority, for PCT/US2015/024844, mailed on Jun. 18, 2015.

* cited by examiner

*Primary Examiner* — Binh Tieu
(74) *Attorney, Agent, or Firm* — Holland & Hart LLP

(57) ABSTRACT

Methods and systems are described for storing video content collected by a home automation system. According to at least one embodiment, an apparatus for accessing video content collected by a home automation system includes a processor, a memory in electronic communication with the processor, and instructions stored in the memory which are executable by a processor to receive at a remote device live video content from a camera of the home automation system, and initiate real-time, two-way audio communication between the remote device and a user of the home automation system via the camera.

19 Claims, 11 Drawing Sheets

REMOTE TALK DOWN TO PANEL, CAMERA AND SPEAKER

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, challenges exist in communicating with the home automation and security products from remote locations.

SUMMARY

Methods and systems are described for storing video content collected by a home automation system. According to at least one embodiment, an apparatus for storing video content collected by a home automation system includes a processor, a memory in electronic communication with the processor, and instructions stored in the memory which are executable by the processor to receive at a remote device live video content from a camera of the home automation system, and initiate real-time, two-way audio communication between the remote device and a user of the home automation system via the camera.

In one example, the instructions may be executable by the processor to transmit audio messages from the remote device to the camera. The instructions may be executable by the processor to receive audio messages transmitted from the camera to the remote device. The instructions may be executable by the processor to display the live video content on the remote device. The remote device may be a portable, handheld device. The instructions may be executable by the processor to confirm the real-time, two-way audio communication prior to transmitting or receiving audio messages. The camera may be integrated into a control panel of the home automation system, and the control panel may include at least one speaker and at least one microphone for the audio communications. The camera may include at least one speaker and at least one microphone.

Another embodiment of the present disclosure relates to a computer-program product for remote talk down using a home automation system. The computer-program product includes a non-transitory computer-readable medium storing instructions executable by a processor to receive real-time video at a computing device located remote from a property monitored by the home automation system. The real-time video is generated by a camera of the home automation system located at the property. The instructions are also executable by the processor to transmit a first audio message from the computing device to the property being monitored by the home automation system, and receive a second audio message generated at the property.

In one example, transmitting the first audio message and receiving the second audio message may occur in real-time. Transmitting the first audio message may include transmitting the first audio message to the camera. Receiving the second audio message may include receiving the second audio message from the camera. The computing device may include a mobile, handheld computing device. The instructions may be executable by a processor to initiate a two-way communication channel between the computing device and the camera.

Another embodiment of the present disclosure relates to a computer-implemented method for communicating between a remote, handheld device and a home automation system. The method includes initiating a two-way communication link between the remote, handheld device and a camera of the home automation system, receiving video content from the camera, and transmitting audio messages from the remote, handheld device to the camera in real-time.

In one example, receiving audio messages transmitted from the camera to the remote, handheld device may occur in real-time. The at least one of the audio messages received from the camera may be responsive to at least one of the audio messages transmitted from the remote, handheld device to the camera. The method may include routing the video content and audio messages through a control panel of the home automation system.

A further embodiment of the present disclosure relates to an apparatus for remote audio communication using a home automation system. The apparatus includes a processor, a memory in electronic communication with the processor, and instructions stored in the memory, wherein the instructions are executable by the processor to transmit live video content from a camera of the home automation system to a remote device, and provide real-time, two-way audio communication between the remote device and a user of the home automation system via the camera.

In one example, the real-time, two-way audio communication may occur concurrently with transmitting the live video content. The instructions may be executable by the processor to collect the live video content with a camera of the home automation system. The home automation system may include at least one speaker and at least one microphone configured to provide the real-time audio communications from a user of the home automation system. The camera may include a microphone and a speaker. The video content and audio communication may be routed through a control panel of the home automation system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
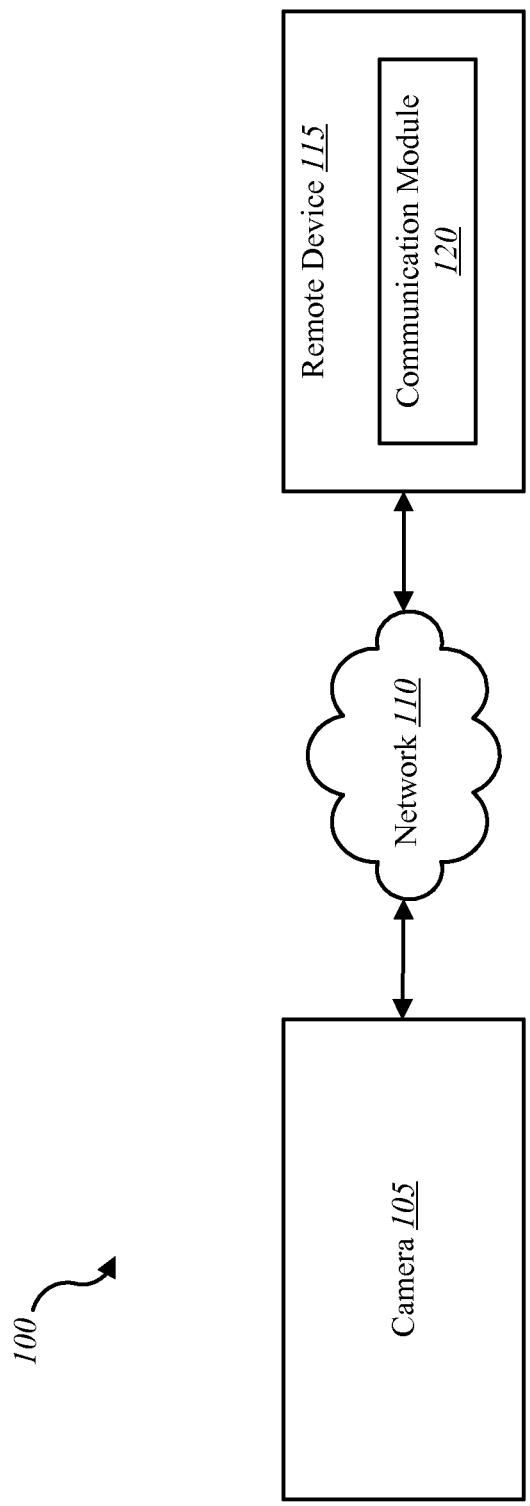
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to storing video content collected by a home automation system. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

Many home automation systems include video and audio capability. The video capability is usually provided by at least one camera that generates a video feed of a viewing area of the camera. The video content may be used for a number of purposes including, for example, occupancy detection and identification of occupant activities. In at least one example, the camera is used to provide a video feed to a remotely-located user of the home automation system such as, for example, a parent or home owner. The video content may provide, for example, a live "look-in" by the parent to see how the family is doing when the parent is located remotely. In another example, the homeowner may use the live "look-in" to monitor activities of a pet, confirm parcel or appliance delivery, watch activities of a repairman or installer, and the like. The video feed may also be used as part of a security system in which unauthorized persons or activities are identified via the live video feed.

Audio capabilities of the home automation system may be used in a variety of ways. For example, a home automation system may include an intercom function wherein a combination of speakers and microphones are used to convey audio messages throughout a property such as a home. Another audio capability is a speaker system used to project music throughout a property or as a sound system for media such as radio, television, gaming systems, and the like. Another capability of the audio features of a home automation system relates to security features such as a microphone that "listens" for sounds that represent an authorized entry to a property or a speaker that sounds an alarm related to breach of a security measure associated with the property. The speakers and microphones of the home automation system may be used to communicate with offsite security personnel such as a 911 operator or a third-party security system administrator.

Typically, the audio capabilities of the home automation system are provided separate from the video capability. That is, the microphone and speaker associated with audio capability of a home automation system operates separately and independently from the cameras and the video feed provided by the cameras.

One aspect of the present disclosure is related to integration of audio and video capability of a home automation system. In one example, real-time video content that is viewable at a remote location from the property being monitored by the home automation system may present to a remote user an opportunity for audio communication with a person located at the property. The microphone and speakers may be used in combination with the camera, which are all located onsite at the property, to provide real-time communication with the remote user. The real-time communication may include one-way video communication and two-way audio communication. The remote user may use a computing device such as a handheld mobile computing device that includes a display, microphone and speaker, which enables the two-way audio communication while viewing a live video feed.

Another aspect of the present disclosure relates to integration of audio capability with a camera of a home automation system. For example, a camera of the home automation system may include at least one microphone and at least one speaker. An audio signal may be delivered from a remote location and projected by the speaker of the camera. A person or other object (e.g., a pet or electronic device) may provide an audio response that is picked up by the microphone of the camera and transmitted to the remote user.

In at least some cases, the remote user may be located at a different room or space of the same property where the camera, microphone and speaker of the home automation system resides. Additionally, or alternatively, the remote user may be positioned at a location remote from the property where the camera, microphone and speaker of the home automation system resides.

In some embodiments, the camera includes only one of the microphone or speaker, and the other of the microphone and speaker not included in the camera is part of the home automation system as a separate device. At least some of the audio capability may be provided by a mobile computing device that provides audio communication between the user located on the property and a remote user, wherein the video communication is provided by the camera. In one example, both the local and remote users may operate an app on a handheld computing device that provides at least one of the audio and video communication.

At least some of the systems and methods disclosed herein may be referred to as remote talk-down systems or methods. A remote talk-down system that provides two-way audio communication, at least one-way video communication, and is associated with a home automation system is an advance in this technical field. Furthermore, providing an integrated camera with audio capability (e.g., microphone and speaker) may help facilitate the real-time, two-way audio communication with a remote location where the live video feed from the camera is viewed. The person viewing the live video feed at the remote location may participate in a real-time, two-way audio communication with a person or object located at the camera. The term "two-way communication" may refer to communication that includes listening to audio (e.g., via a speaker) and generating an audio message (e.g., a microphone). The term "real-time" may include relatively instantaneous communications, with expected brief delays associated with transmission of the electronic signal over any of a variety of communication mediums (e.g., wired or wireless). For example, a telephone conversation conducted over a wired or wireless systems typically provides real-time audio communication, although brief delays may occur depending upon, for example, the distance between persons participating in the call and the technology used (e.g., satellite, wireless, fiber optic, etc.).

FIG. 1 is a block diagram of one embodiment of environment 100 in which the present systems and methods may be implemented. In some embodiments, the systems and methods described herein may be performed, at least in part, using a camera 105, which communicates with a remote device 115 via a network 110. The remote device 115 may include a communication module 120, or communication module 120 may be operated at least in part using remote device 115. Typically, camera 105 is located locally such as at a property monitored by a home automation system. The home automation system may be part of or include environment 100.

Remote device 115 is typically located remotely relative to camera 105. The remote location may be, for example, another room of a building from where the camera 105 is located. Alternatively, the remote location may be a location remote from the property being monitored by the home automation system and wherein camera 105 resides. In one example, camera 105 is located at a user's home and the remote device 115 is located at a user's place of business that is separate from the user's home. In still further examples, remote device 115 is a mobile device such as a handheld mobile device, a tablet computing device, or the like, which may be located at any number of locations that are remote relative to camera 105.

Communication module 120 may facilitate communication of video and audio content between camera 105 and remote device 115. For example, communication module 120 may facilitate receipt and display of video content generated by camera 105 on the remote device 115. Communication module 120 may provide two-way audio communication between camera 105 and remote device 115. In at some examples, camera 105 and remote device 115 each include components necessary for two-way audio communication such as, for example, at least one microphone and at least one speaker. Communication module 120 may facilitate real-time, two-way audio communication and real-time, one-way video communication using the components of camera 105 and remote device 115. In other examples, communication module 120 may facilitate video communication between camera 105 and remote device 115, and may facilitate audio communication between remote device 115 and at least one other device separate from camera 105 (e.g., a microphone and/or speaker positioned in close proximity to camera 105, such as within the same room as camera 105).

In one embodiment, camera 105 is located at a user's home and is operable to provide a live video feed to remote device 115 showing one or more persons positioned in the home. Environment 100 may also include audio capability via at least one microphone and at least one speaker of camera 105 to provide real-time, two-way audio communication between the one or more users at the home and the user of remote device 115 (e.g., via communication module 120). The remote user may view the persons within the viewing area of camera 105 via the real-time video feed while concurrently talking to the persons shown in the video feed and listening to audio responses from the persons via the remote device 115. The audio and video content may be delivered over network 110. Network 110 may include wired or wireless communication mediums. In at least one example, network 110 includes the Internet.

Communication module 120 is shown in FIG. 1 as a component of remote device 115. In other examples, communication module 120 may be carried by or operable using a separate component from remote device 115, but may be in communication with remote device 115 to provide its functionality to the user of remote device 115. In other examples, camera 105 may include a separate communication module or related module and/or functionality. Alternative embodiments including at least some of the components of environment 100 are described below with references to FIGS. 2-6.

Figure 2:
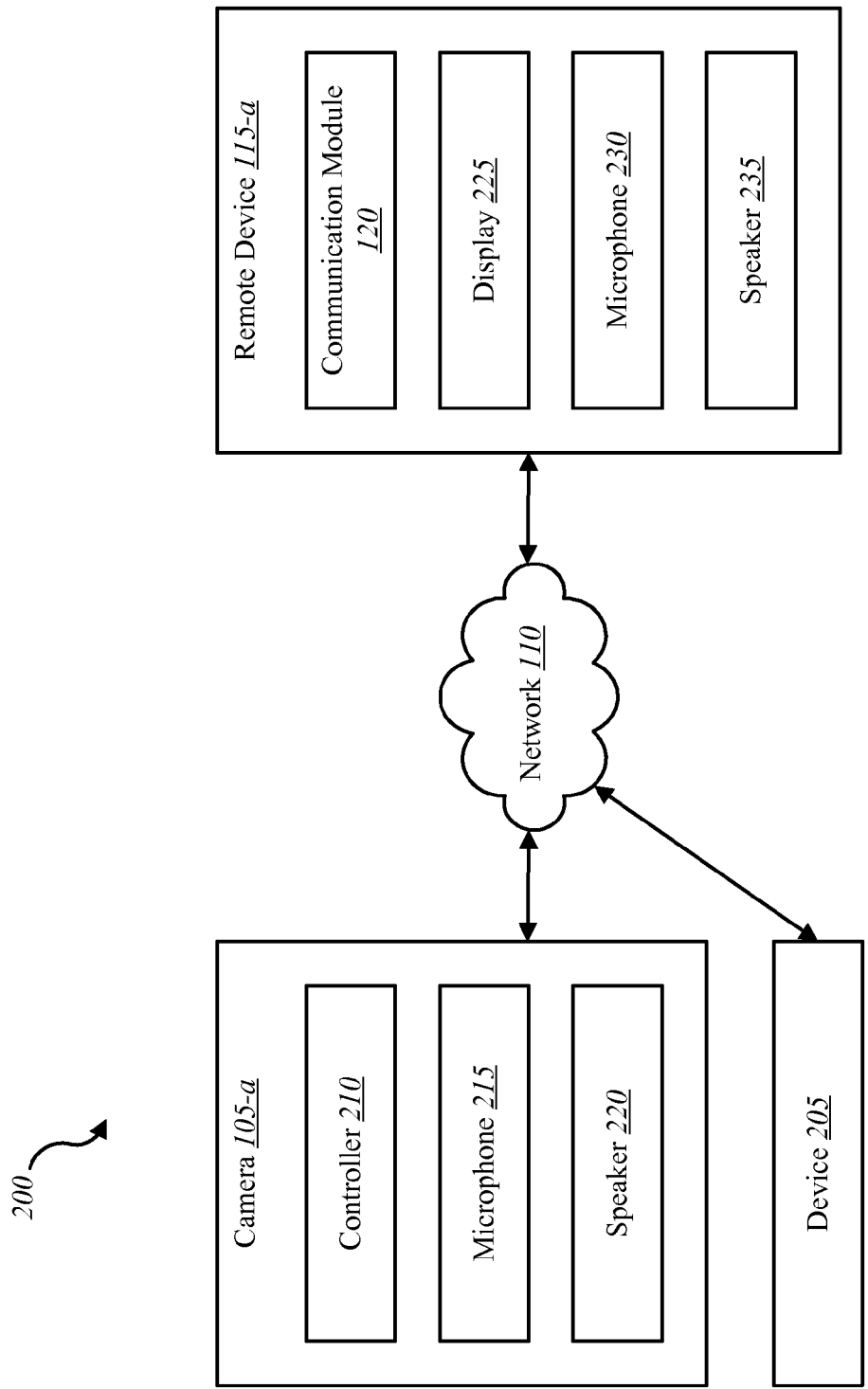
FIG. 2 is a block diagram of another environment in which the present systems and methods may be implemented.

FIG. 2 shows another environment 200 that may include the components of environment 100 described above, and may further include a device 205, a camera 105-*a* including a controller 210, a microphone 215 and a speaker 220. Environment 200 also includes a remote device 115-*a* having, in addition to communication module 120, a display 225, a microphone 230, and a speaker 235.

Device 205 may be in direct communication with camera 105-*a*. Additionally or alternatively, device 205 may also be in direct communication with network 110, which provides electronic communication with both camera 105-*a* and remote device 115-*a*. Device 205 may include, for example, a control panel of the home automation system. In other examples, device 205 may include other types of electronic devices such as, for example, a desk top computer, a lap top computer, a tablet computer or a handheld mobile device such as a smart phone.

Controller 210 may provide logic for camera 105-*a* to permit camera 105-*a* to operate independently of other devices such as a control panel of the home automation system (e.g., communicate directly with remote device 115-*a* via network 110). Controller 210 may provide logic for operating a microphone 215 and speaker 220 as a part of providing real-time, two-way audio communication with remote device 115-*a*. In some examples, camera 105-*a* additionally includes a communication module (e.g., communication module 120) that assists in providing and/or facilitating at least one of the video and audio communication with remote device 115-*a*.

Microphone 215 may include at least one microphone that collects audio content from one or more persons or objects in proximity to camera 105-*a*. For example, a person standing in front of or within a viewable area of camera 105-*a* may generate an audio message that is collected by microphone 215 and delivered to remote device 115-*a*. Speaker 220 includes at least one speaker device that conveys an audio message from remote device 115-*a* to, for example, a person within the viewable area of camera of 105-*a*.

Microphone 215 and speaker 220 may be integrated into a common housing of camera 105-*a*. Additionally or alternatively, microphone 215 and speaker 220 may be dedicated to camera 105-*a*, but may be positioned outside of a housing of camera 105-*a* (e.g., mounted adjacent to or in relative close proximity to the housing of camera 105-*a*). Microphone 215 and speaker 220 may be dedicated solely to providing audio communications in connection with camera 105-*a* alone. Alternatively, microphone 215 and speaker 220 may have additional functionality separate from providing audio communications in connection with camera 105-*a*. For example, microphone 215 and speaker 220 may provide at least some audio functionality for a home automation system of environment 200 such as, for example, providing intercom functionality, sounding an alarm, speaking voice commands, etc.

Display 225 may provide display of at least some of the video content received from camera 105-*a*. Display 225 may provide a real-time display of video content from camera 105-*a*. Display 225 may be integrated into a housing of remote device 115-*a*. Display 225 may include, for example, a touch screen.

Microphone 230 may include at least one microphone device operable to convey an audio message provided by a user of remote device 115-*a* to, for example, speaker 220 of camera 105-*a*. Speaker 235 may include at least one speaker device and may project an audible message to the user of remote device 115-*a* from, for example, microphone 215 of camera 105-*a*. Microphone 230 and speaker 235 may facilitate real-time, two-way audio communication between the user of remote device 115-*a* and one or more persons or objects associated with camera 105-*a* (e.g., via microphone 215 and speaker 220). Microphone 230 and speaker 235 may be housed within a common housing of remote device 115-*a* along with display 225. Alternatively, at least one of display 225, microphone 230 and speaker 235 may be positioned outside of the housing of remote device 115-*a*, while remaining in operational connection with other components of remote device 115-*a*.

Communication module 120 may provide communication between display 225, microphone 230 and speaker 235 with the components of camera 105-*a* (e.g., microphone 215 and speaker 220). Communication module 120 may provide communication between any of the components of remote device 115-*a* and other devices and systems, such as, for example, device 205. Network 110 facilitates communication between camera 105, remote device 115-*a*, and device 205, or other components of environment 200. Network 110 may include local area networks (LAN), wide-area networks (WAN), virtual private networks (VPN), wireless networks (using 802.11, for example) and/or cellular networks (using 3G and/or LTE, for example), etc. In some embodiments, network 110 may include the Internet.

Figure 3:
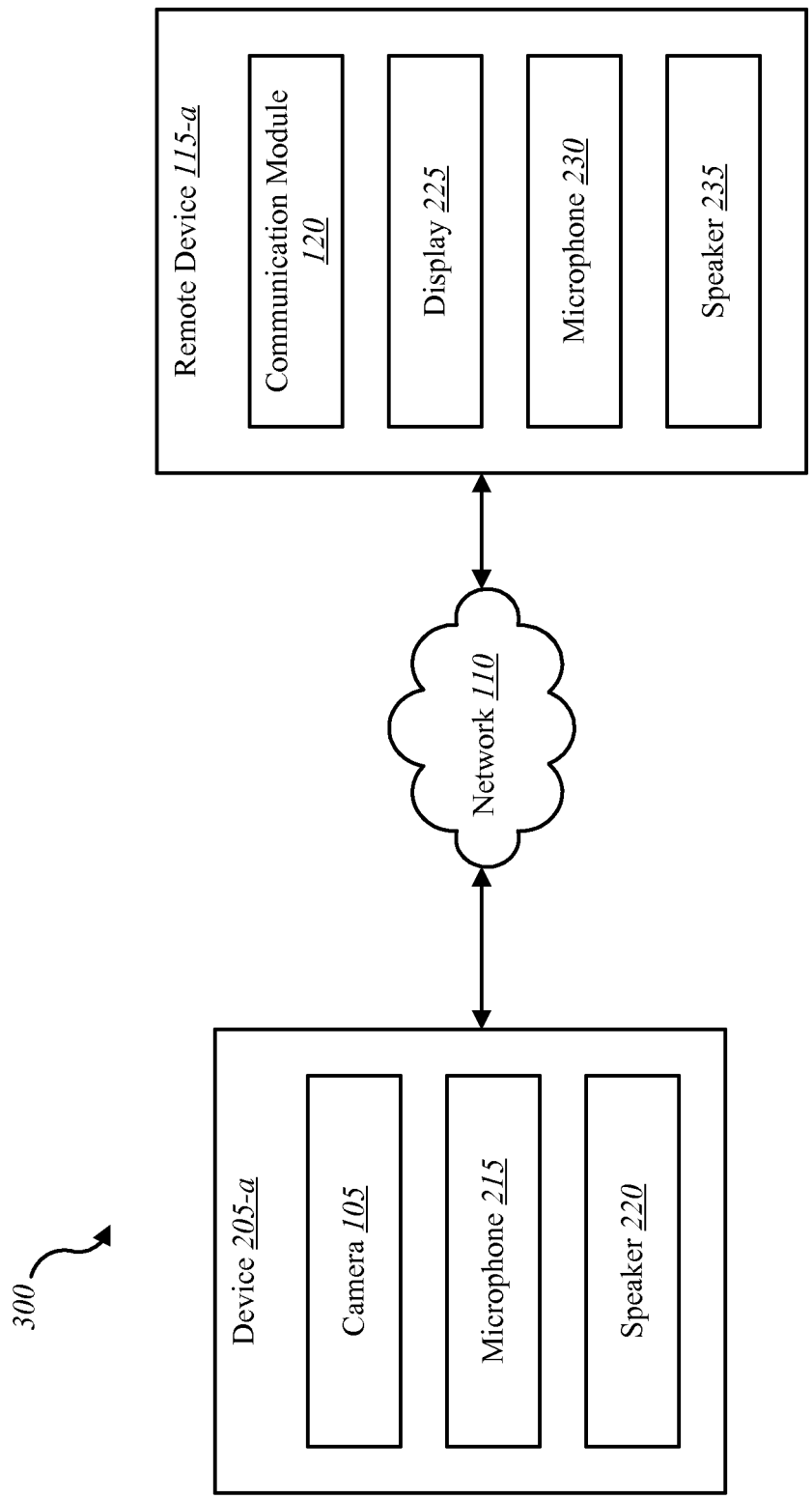
FIG. 3 is a block diagram of another environment in which the present systems and methods may be implemented.

FIG. 3 shows another environment 300 that may include the components of environments 100, 200, described above, and may further include a device 205-*a* having camera 105, microphone 215 and speaker 220. In at least one example, device 205-*a* may be a control panel of a home automation system. Camera 105, microphone 215 and speaker 220 are shown as components of device 205-*a*, and may be included in a common housing of device 205-*a*. The camera 105, microphone 215 and speaker 220 may have many different functions and purposes. One such function may be to provide a video feed to remote device 115-*a* and provide two-way real-time audio communication between device 205-*a* and remote device 115-*a*. Other functions include, for example, providing face recognition using camera 105, providing voice recognition using microphone 215, and projecting an alarm or other indicators associated with automation or security features of the home automation system with which device 205-*a* is associated.

Device 205-*a* may represent at least one control panel of the home automation system. In one embodiment, device 205-*a* may represent other types of electronic devices associated with a home automation system. Device 205-*a* may be a single, permanently wall-mounted device. Alternatively, device 205-*a* may be a portable device, and/or may include a plurality of devices (e.g., control panels), wherein each control panel includes at least one of camera 105, microphone 215, and speaker 220. In some arrangements, camera 105, microphone 215 and speaker 220 may be positioned outside of a housing of device 205-*a*, but may be dedicated to or specifically associated with device 205-*a*.

Remote device 115-*a* may receive video content from camera 105 in real-time. Remote device 115-*a* may facilitate real-time, two-way audio communication with device 205-*a*. The audio communication between remote device 115-*a* and device 205-*a* may be referred to as remote talk-down to device 205-*a* (e.g., control panel), camera 105, or speaker 220.

Figure 4:
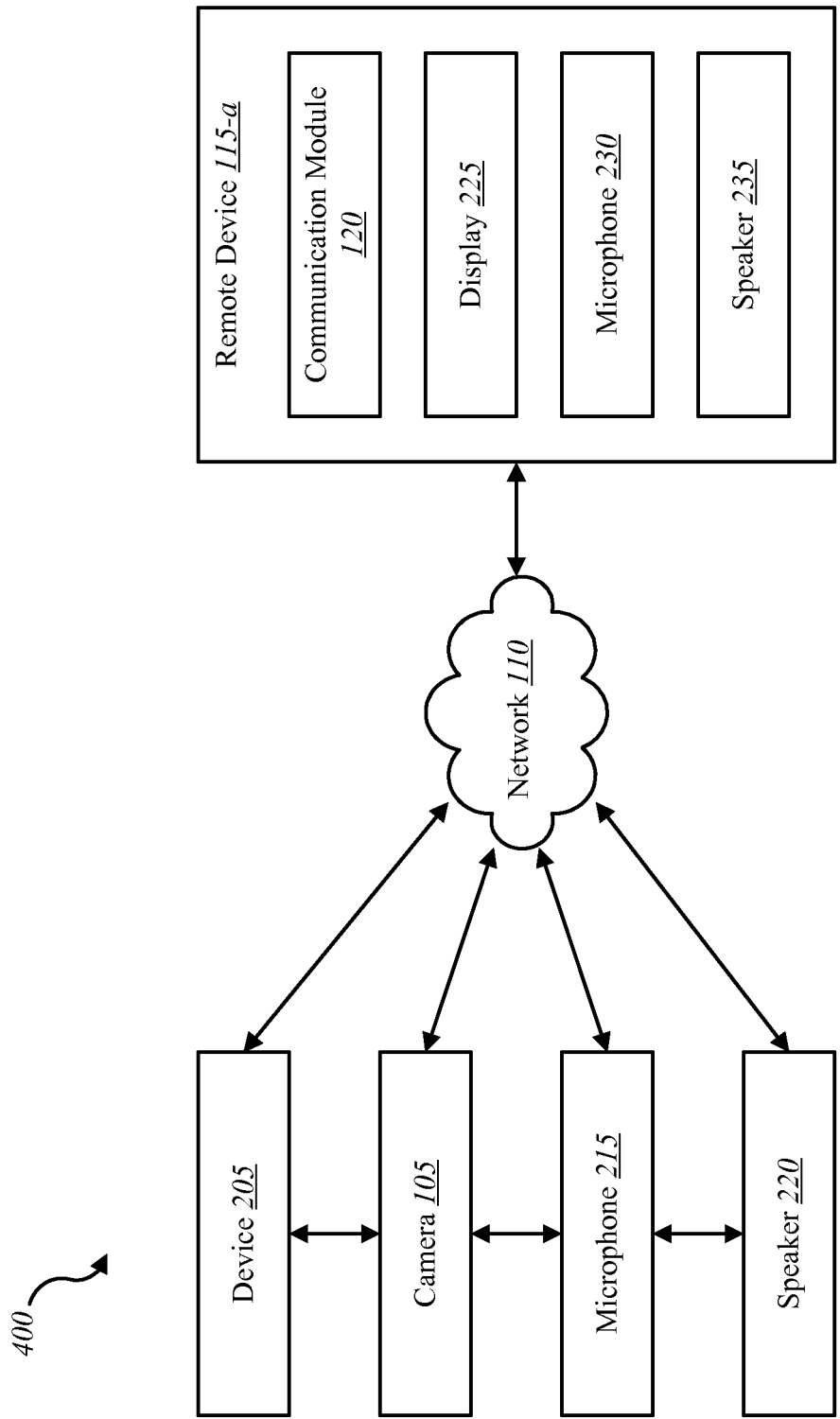
FIG. 4 is a block diagram of another environment in which the present systems and methods may be implemented.

FIG. 4 shows another environment 400 that may include the components of environments 100, 200, 300 described above, and may further include device 205, camera 105, microphone 215 and speaker 220 provided as separate and distinct components of environment 400 and/or a home automation system. Device 205, camera 105, microphone 215 and speaker 220 may separately communicate with remote device 115-*a* via network 110. Device 205, camera 105, microphone 215 and speaker 220 may communicate directly with each other separate from communication via network 110. Device 205, camera 105, microphone 215 and speaker 220 may, in some embodiments, communicate directly with any one of communication module 120, display 225, microphone 230 and speaker 235 of remote device 115-*a* via network 110 or other communication means.

While device 205, camera 105, microphone 215, and speaker 220 are shown as separate components, at least some of these components may be integrated into a single housing, may be located in close proximity to each other or remote from each other, and generally may provide the remote talk down from remote device 115-*a* to one or more users associated with device 205, camera 105, microphone 215, and/or speaker 220.

Figure 5:
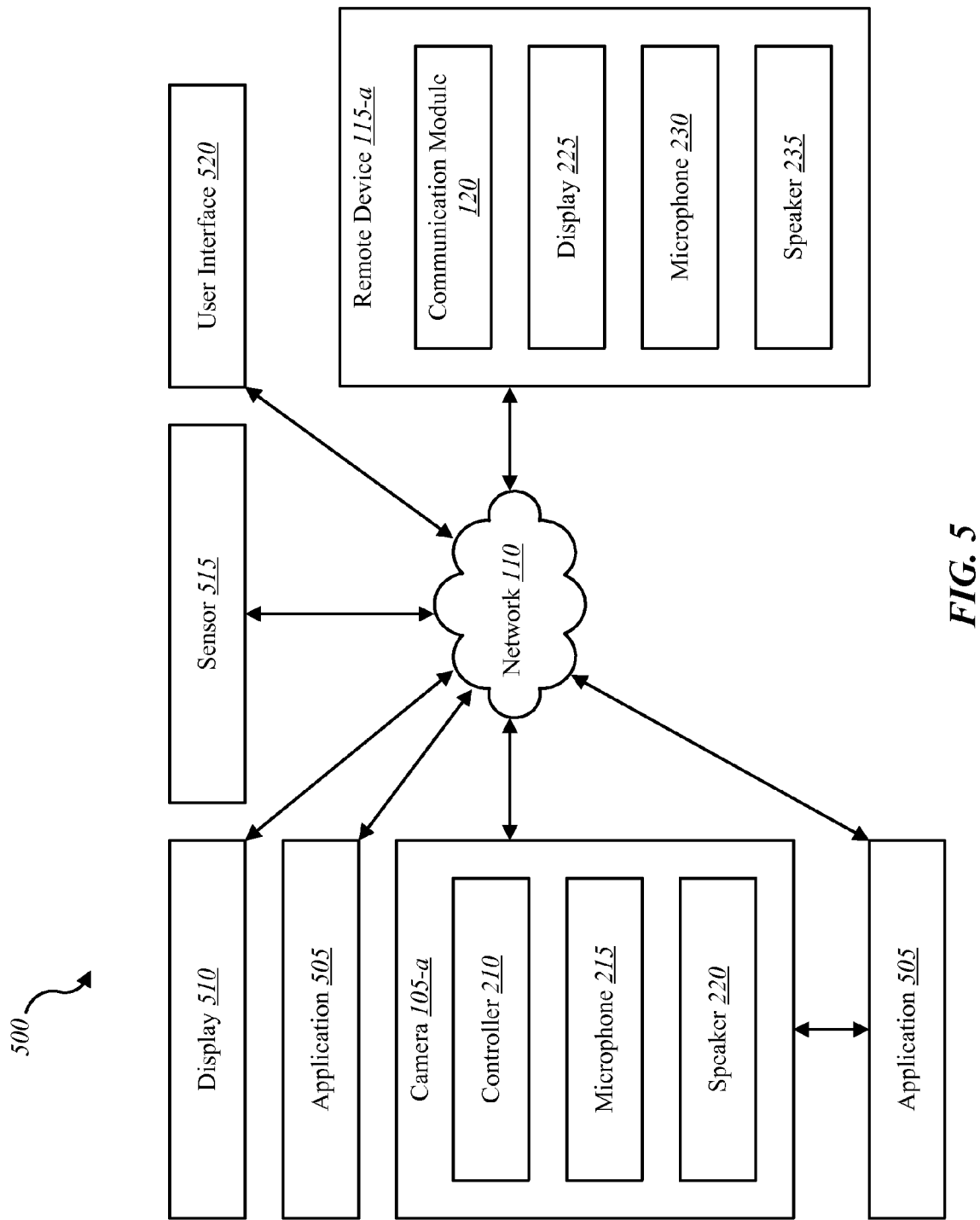
FIG. 5 is a block diagram of another environment in which the present systems and methods may be implemented.

FIG. 5 shows another environment 500 that may include the components of environments 100, 200, 300, 400 described above, and may further include an application 505, a display 510, a sensor 515, and a user interface 520. Camera 105-*a* may include the same or similar configuration as shown in FIG. 2 with reference to environment 200, but may, in other embodiments, have other configurations as shown in FIGS. 1, 3, and 4. Application 505, display 510, sensor 515, and user interface 520 may be used with any of the environments 100, 200, 300, 400 described herein.

Application 505 may allow a user (e.g., a user within the field of view of camera 105-*a* or the remote user of remote device 115-*a*), to control either directly or via device 205 or controller 210, an aspect of the monitored property, including security, energy management, locking and unlocking doors, checking the status of a door, locating a user or item, controlling lighting, thermostat, or cameras, and receiving notifications regarding a current status or anomaly associated with a home, office, place of business, and the like. In some configurations, application 505 may enable device 205 and/or camera 105-*a* to interface with controller 210 and/or remote device 115-*a* and provide the user interface 520 to display an automation, security, and/or energy management content on device 205 and/or remote device 115-*a*. Thus, application 505 via user interface 520 may allow users to control aspects of their home, office, and/or other type of property. Further, application 505 may be installed on device 205, camera 105-*a*, and/or remote device 115-*a*.

Display 510 may include, for example, a digital display as part of, for example, a control panel of environment 500 (e.g., a home automation system). Display 510 may be provided via devices such as, for example, a desktop computer or a mobile computing device (e.g., remote device 115-*a*). The user interface 520 may be integrated into display 510. Such a user interface 520 may include a plurality of menus, screens, microphones, speakers, cameras, and other capability that permit interaction between the user and the home automation system or any component of environment 500. Additionally, or alternatively, the user interface 520 with display 510 may be integrated into camera 105-*a*, device 205, and/or remote device 115-*a*.

Sensor 515 may include, for example, a camera sensor, an audio sensor, a forced entry sensor, a shock sensor, a proximity sensor, a boundary sensor, an appliance sensor, a light fixture sensor, a temperature sensor, a light beam sensor, a three-dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacitance sensor, a radio frequency sensor, a near-field sensor, a heartbeat sensor, a breathing sensor, an oxygen sensor, a carbon dioxide sensor, a brainwave sensor, a motion sensor, a voice sensor, a touch sensor, and the like. The camera 105-*a* may include video and still-shot images and may be part of or integrated into one or more of sensors 515. Camera 105-*a* may have included or have integrated therein one or more of the sensors 515. Similarly, remote device 115-*a* and/or device 205 may include or have integrated therein one or more of the sensors 515. Although sensor 515 is depicted as a separate component from camera 105, device 205, and remote device 115-*a*. In some embodiments, sensor 515 may be connected directly to any one of those components or other components of environment 500. Additionally, or alternatively, sensor 515 may be integrated into a home appliance or fixture such as a lightable fixture. The information provided by sensor 515 may be used to generate or identify an event for the purpose of operating camera 105-*a* or a component thereof, device 205, or remote device 115, or a component thereof.

In one example, remote device 115-*a* receives a notification when camera 105-*a* identifies a person within a viewable area covered by camera 105-*a* based on a motion sensor 515. The user of remote device 115-*a* may, in real-time, send an audio message via microphone 230 and speaker 220 to the person within the viewable area of camera 105-*a*. The user of remote device 115-*a* may receive audio feedback from the person within the viewing area of camera 105-*a* via microphone 215 and speaker 235.

Figure 6:
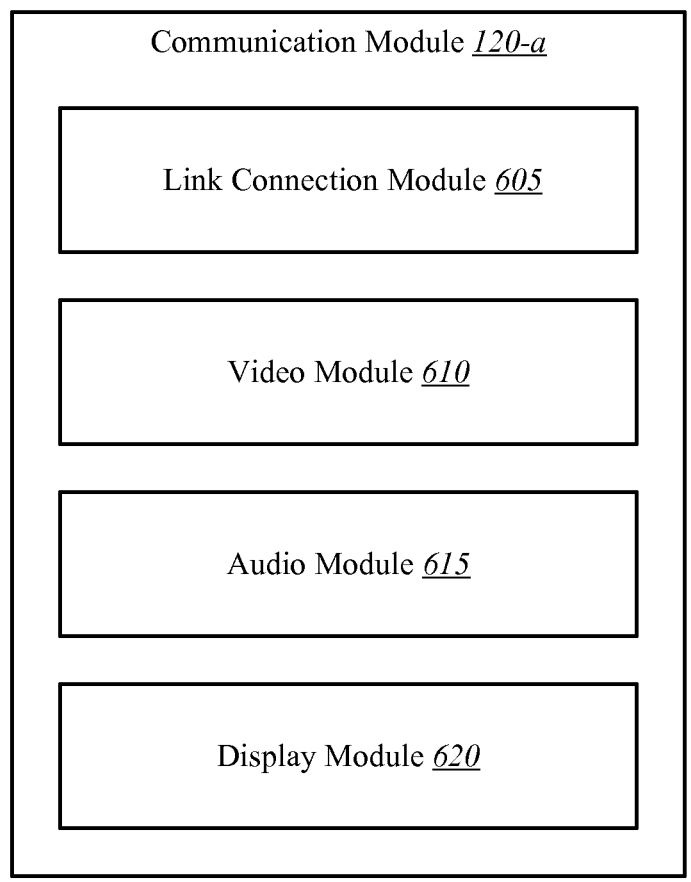
FIG. 6 is a block diagram of a communication module for use in at least one of the environments shown in FIG. 1-5.

FIG. 6 is a block diagram illustrating an example communication module 120-*a*. Communication module 120-*a* may be one example of the communication module 120 shown in any of FIGS. 1-5. Communication module 120-*a* may include a link connection module 605, a video module 610, an audio module 615, and a display module 620.

Link connection module 605 may operate to create at least one of a video link and an audio link between, for example, a remote device (e.g., remote device 115 shown in FIG. 1-5) and a camera, microphone, and/or speaker located at, for example, a property monitored by a home automation system. One function of communication module 120-*a* is to create a communication link or a connection whereby video and/or audio data is transmitted between a remote device (e.g., remote device 115 shown in FIGS. 1-5) and another device such as a camera (e.g., camera 105 shown in FIGS. 1-5). The communication link or channel provided by link connection module 605 may be tested and/or confirmed prior to attempting to transmit video or audio data across the link/connection.

Video module 610 may operate to provide transmission of video content between the remote device (e.g., remote device 115) and the camera (e.g., camera 105), which is located remote from the remote device. Video module 610 may provide real-time communication of video content.

Audio module 615 may provide audio communication between a remote device and audio features located at a separate location (e.g., a property monitored by home automation system). Audio module 615 may provide real-time, two-way communication between a remote device and the local audio components. For example, audio module 615 may provide communication between a microphone of the remote device and a speaker of the local device/system, or provide communication between a microphone of the local device/system and a speaker of the remote device. The video module 610 and audio module 615 may operate to provide real-time video and audio communication concurrently.

Display module 620 may provide display of video content at a remote device. The video content may be generated by a camera located remote from the remote device (e.g., locally at a property monitored by a home automation system).

Video module 610 may cooperate with display module 620 to display the video content. Video module 610, audio module 615, and display module 620 may cooperate with link connection module 605 to provide and maintain reliable video and audio communication. While the audio communication provided by audio module 615 is typically two-way communication, video communication via video module 610 is typically one-way communication (e.g., from camera 105 to remote device 115). Additionally, or alternatively, the video provided by video module 610 may be two-way communication. As discussed in detail throughout, the video content is typically provided by a camera of a home automation system, which may include automation and security features. The audio components associated with the camera may be integrated into a common housing of the camera, provided as dedicated audio components associated only with a specific camera, or provided as audio components associated only with other features of a home automation system in addition to the camera.

Communication module 120-*a* may include more or fewer modules in other embodiments. As discussed above, communication module 120-*a* may be part of a remote device (e.g., remote device 115) or other components or devices of a home automation system (e.g., camera 105 or device 205). In at least some examples, communication module 120-*a* may include a separate module or facilitate storing at least some of the video and/or audio content communicated between the remote device and the camera or other components of the home automation system.

Figure 7:
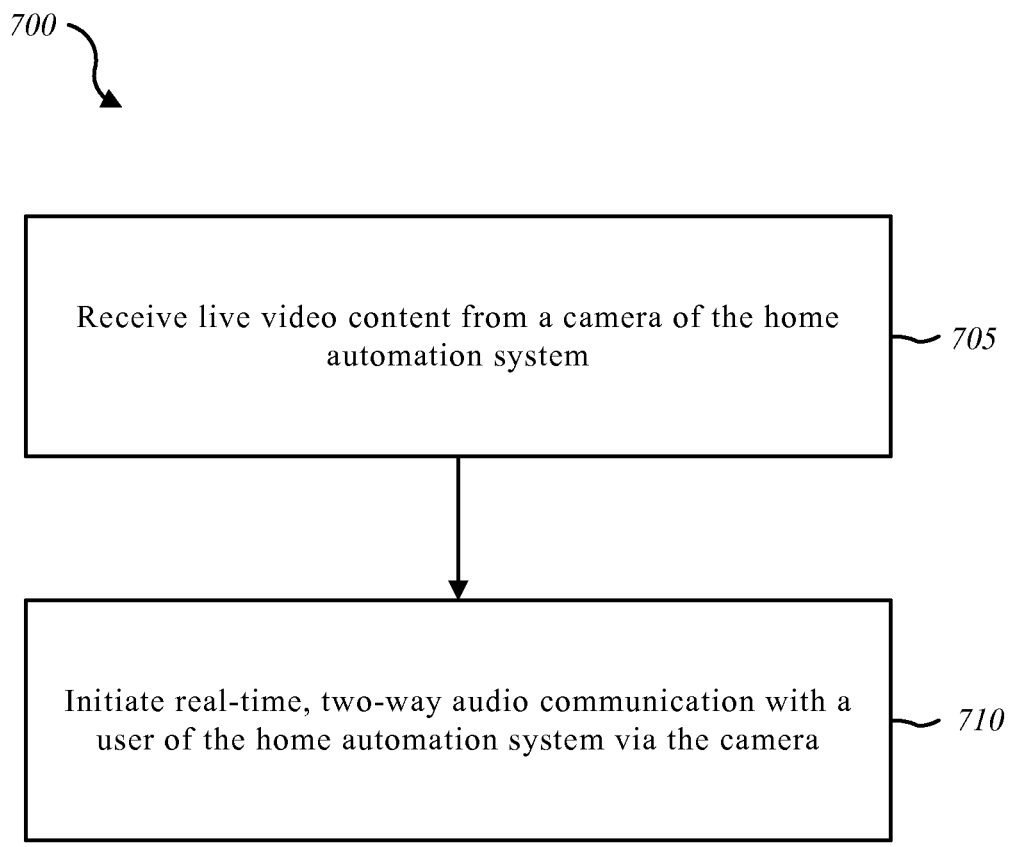
FIG. 7 is a flow diagram illustrating a method for remote audio communication using a home automation system.

FIG. 7 is a flow diagram illustrating one embodiment of a method 700 for remote audio communication using a home automation system. In some configurations, the method 700 may be implemented with any of the communication modules 120 shown in FIGS. 1, 2, 3, 4, 5, and/or 6. In some examples, method 700 may be performed generally by remote device 115, camera 105, controller 210, or device 205 shown in FIGS. 1-5, or even more generally by the environments 100, 200, 300, 400, 500 shown in FIGS. 1-5.

At block 705, method 700 includes receiving at a remote device live video content from a camera of a home automation system. Block 710 includes initiating real-time, two-way audio communication between a remote device and a user of the home automation system via the camera.

Other steps of method 700 may include transmitting audio messages from the remote device to the camera. Method 700 may include receiving audio messages transmitted from the camera to the remote device, and displaying the video content on the remote device. The remote device may be a portable, handheld device. Method 700 may include confirming the real-time, two-way audio communication prior to transmitting or receiving audio messages. The camera may be integrated into a control panel of the home automation system, and the control panel may include at least one speaker and at least one microphone for the audio communications. The camera may include at least one speaker and at least one microphone.

Figure 8:
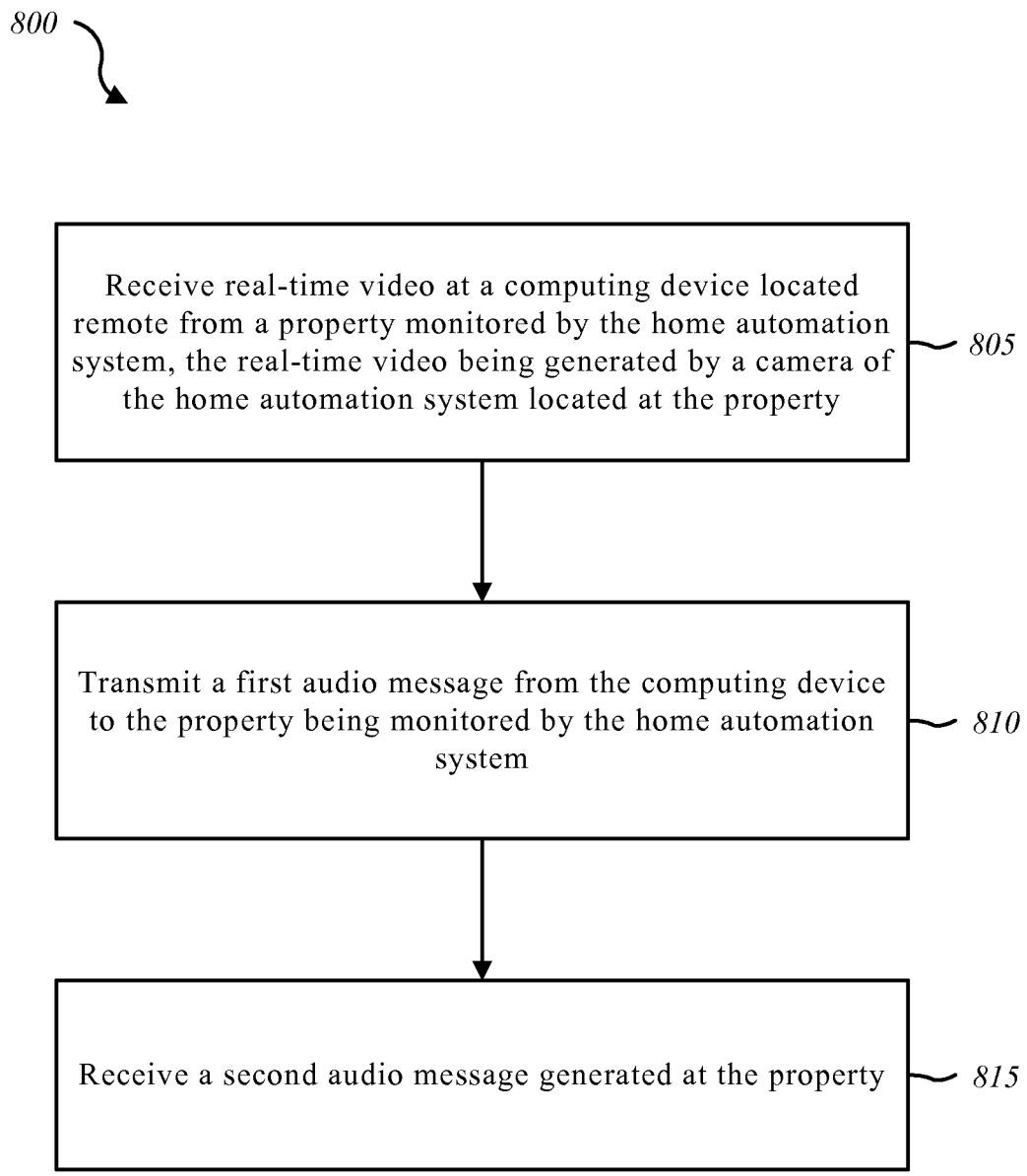
FIG. 8 is a flow diagram illustrating a method for remote talk down using a home automation system.

FIG. 8 is a flow diagram illustrating one embodiment of a method 800 for remote talk down using a home automation system. In some configurations, the method 800 may be implemented by any one of the communication modules 120 described with reference to FIGS. 1-5. In other examples, method 800 may be performed generally by remote device 115, camera 105, and/or device 205 described with reference to FIGS. 1-5, or even more generally by the environments 100, 200, 300, 400, 500 shown in FIGS. 1-5.

At block 805, method 800 includes receiving real-time video at a computing device located remote from a property that is monitored by the home automation system. The real-time video is generated by a camera of the home automation system that is located at the property. At block 810, the method 800 includes transmitting a first audio message from the computing device to the property being monitored by the home automation system. Block 815 includes receiving a second audio message generated at the property.

Method 800 may also include transmitting the first audio message and receiving the second audio message in real-time. Transmitting the first audio message may include transmitting the first audio message to the camera. Receiving the second audio message may include receiving the second audio message from the camera. The computing device may include a mobile, handheld computing device. The method 800 may include initiating a two-way communication channel between the computing device and the camera.

Figure 9:
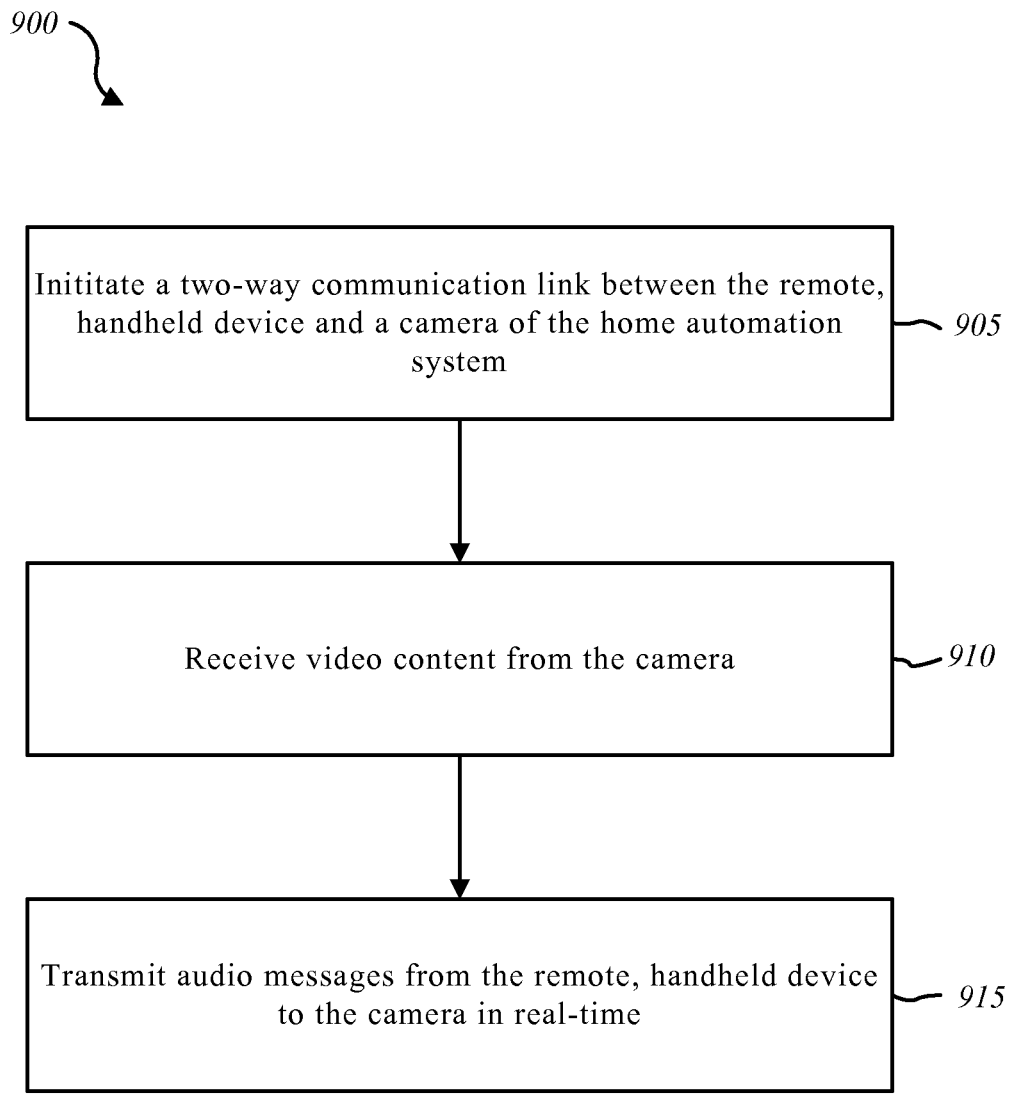
FIG. 9 is a flow diagram illustrating a method for communicating between a remote-handheld device and a home automation system.

FIG. 9 is a flow diagram illustrating one embodiment of a method for communicating between a remote, handheld device and a home automation system. In some configurations, the method 900 may be implemented by any one of the communication modules 120 described with reference to FIGS. 1-5. In other examples, method 900 may be performed generally by any of remote device 115, camera 105, and/or device 205, or even more generally by the environments 100, 200, 300, 400, 500 shown in FIGS. 1-5.

At block 905, the method 900 includes initiating a two-way communication between the remote, handheld device and a camera of the home automation system. Block 910 includes receiving video content from the camera. Block 915 includes transmitting audio messages from the remote, handheld device to the camera in real-time.

Method 900 may also include receiving audio messages from the camera to the remote, handheld device in real-time. Method 900 may include routing the video content and audio messages through a control panel of the home automation system. At least one of the audio messages received from the camera may be responsive to at least one of the audio messages transmitted from the remote, handheld device.

Figure 10:
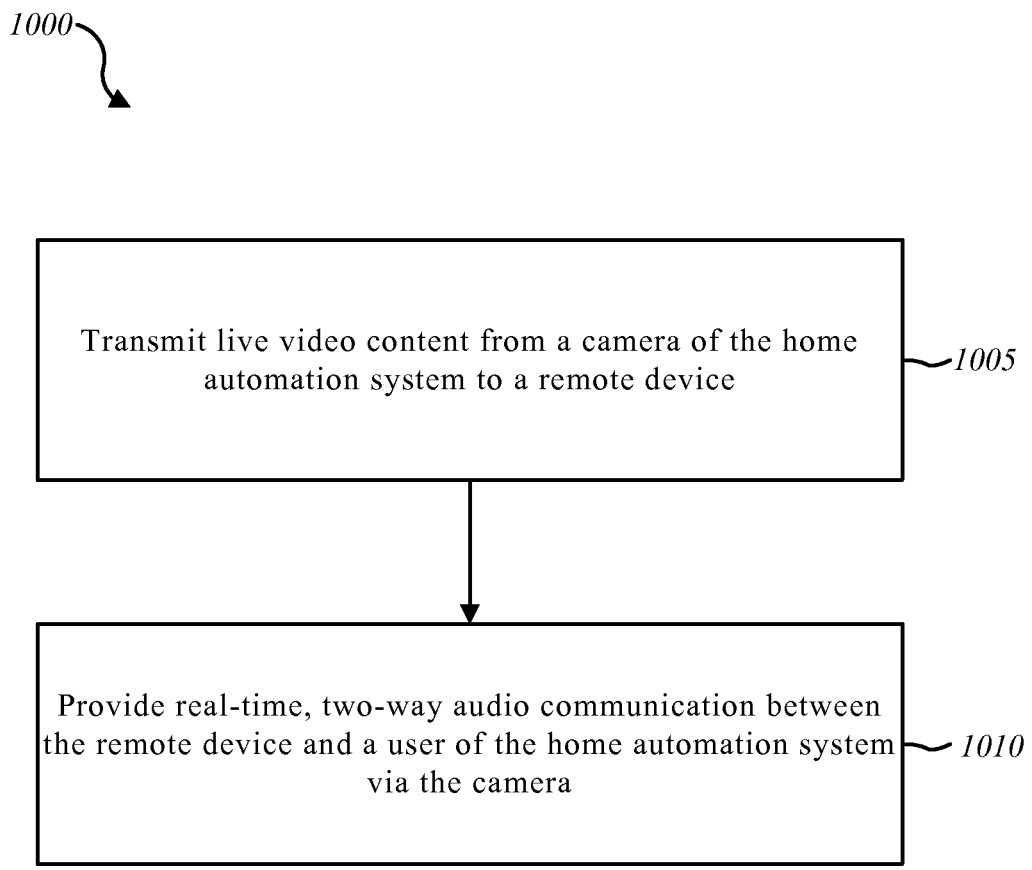
FIG. 10 is a flow diagram illustrating a method for remote audio communication using a home automation system.

FIG. 10 is a flow diagram illustrating one embodiment of a method 1000 for remote audio communication using a home automation system. The method 1000, in some configurations, may be implemented by any one of the communication modules 120 described with reference to FIGS. 1-5. In other examples, method 1000 may be performed generally by any one of remote device 115, camera 105, and device 205 shown in FIGS. 1-5, or even more generally by the environments 100, 200, 300, 400, 500 shown in FIGS. 1-5.

At block 1005, the method 1000 includes transmitting live video content from a camera of the home automation system to a remote device. Block 1010 includes providing real-time, two-way audio communication between the remote device and a user of the home automation system via the camera.

The method 1000 may also include providing the real-time, two-way audio communication concurrently with transmitting the live video content. The method 1000 may include collecting the live video content with a camera of the home automation system. The home automation system may include at least one speaker and at least one microphone configured to provide the real-time audio communications from a user of the home automation system. The camera may include a microphone and a speaker. The video content and audio communication may be routed through a control panel of the home automation system.

Figure 11:
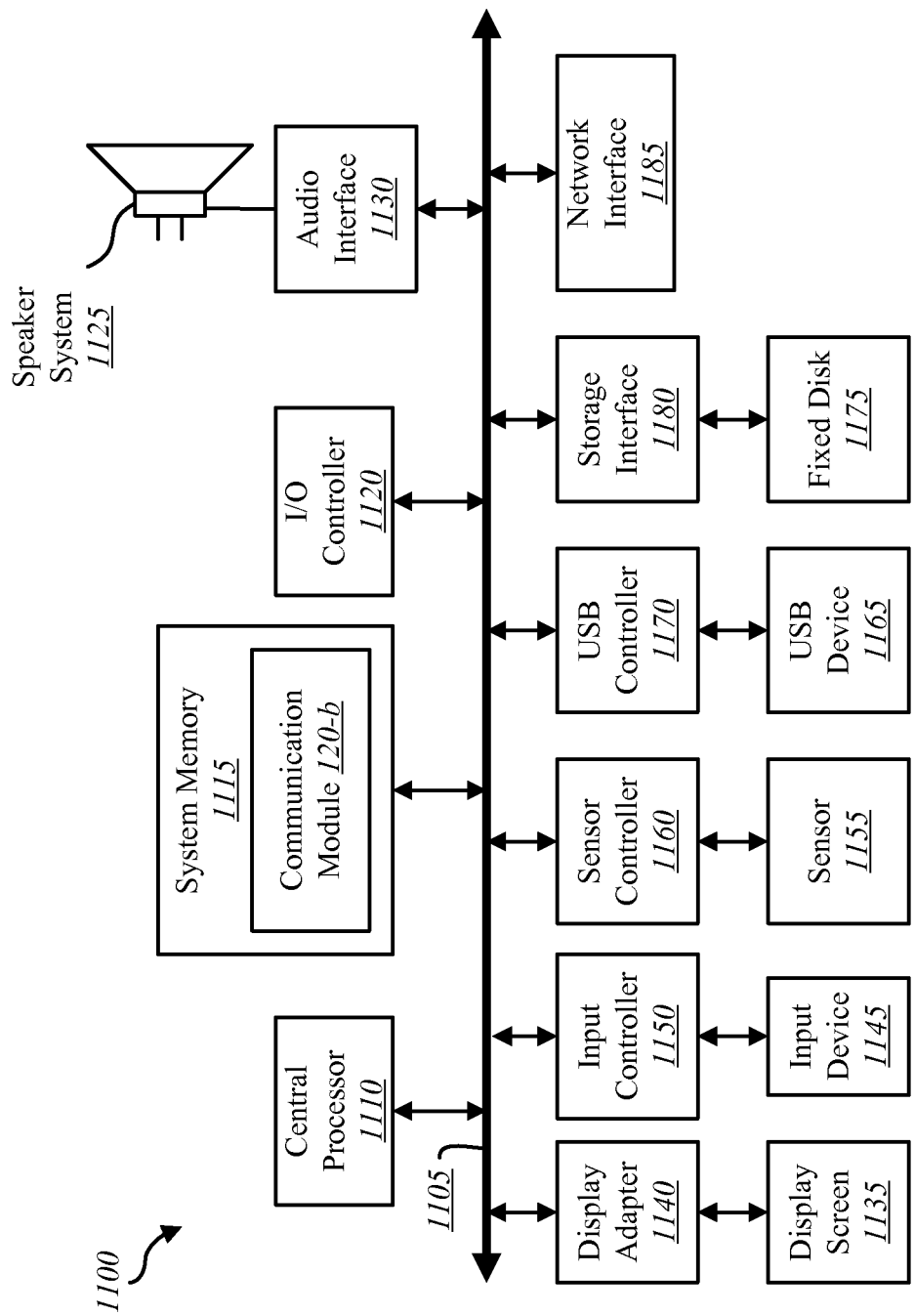
FIG. 11 is a block diagram of a computer system suitable for implementing the present systems and methods of FIGS. 1-10.

FIG. 11 depicts a block diagram of a controller 1100 suitable for implementing the present systems and methods. The controller 1100 may be an example of the controller 210 of camera 105 or the remote device 115, device 205, and/or camera 105 illustrated in FIGS. 1, 2, 3, 4 and/or 5. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 (e.g., controller 210) and system memory 1115, which may include read-only memory (ROM) or flash memory (neither shown), and random access memory (RAM) (not shown), as previously noted. Communication module 120-*b*, which is one example of communication module 120 shown in FIGS. 1-5, may be stored in system memory 1115. Any of the modules discloses with reference to FIGS. 1-5 may be stored in system memory 1115. The RAM is generally the main memory into which the operating system and application programs are loaded. The ROM or flash memory can contain, among other code, the Basic Input-Output system (BIOS) which controls basic hardware operation such as the interaction with peripheral components or devices. Applications (e.g., application 505) resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for remote audio communication using a home automation system, comprising:
   a processor;
   a memory in electronic communication with the processor; and
   instructions stored in the memory, the instructions being executable by the processor to:

receive live video content from a camera of the home automation system; and initiate real-time, two-way audio communication with a user of the home automation system via the camera, wherein the real-time, two-way audio communication is tested and confirmed prior to transmitting or receiving audio messages associated with the real-time, two-way audio communication.

2. The apparatus of claim 1, wherein the instructions are executable by the processor to:

transmit audio messages to the camera.

3. The apparatus of claim 2, wherein the instructions are executable by the processor to:

receive audio messages transmitted from the camera.

4. The apparatus of claim 1, wherein the instructions are executable by the processor to:

display the live video content.

5. The apparatus of claim 1, wherein the apparatus is a portable, handheld device.

6. The apparatus of claim 1, wherein the camera is integrated into a control panel of the home automation system, the control panel including at least one speaker and at least one microphone for the audio communications.

7. The apparatus of claim 1, wherein the camera includes at least one speaker and at least one microphone.

8. A computer-implemented method for communicating between a remote, handheld device and a home automation system, comprising:

initiating a two-way communication link between the remote, handheld device and a camera of the home automation system;

receiving video content from the camera;

testing and confirming the two-way communication link; and transmitting audio messages from the remote, handheld device to the camera in real-time.

9. The method of claim 8, further comprising:

receiving audio messages transmitted from the camera to the remote, handheld device in real-time.

10. The method of claim 9, wherein at least one of the audio messages received from the camera are responsive to at least one of the audio messages transmitted from the remote, handheld device to the camera.

11. The method of claim 8, further comprising:

routing the video content and audio messages through a control panel of the home automation system.

12. The method of claim 8, further comprising:

receiving the audio message from the camera in real-time.

13. The method of claim 8, wherein initiating the two-way communication link includes operating a app on the remote, handheld device.

14. An apparatus for remote audio communication using a home automation system, comprising:

a processor;

a memory in electronic communication with the processor; and instructions stored in the memory, the instructions being executable by the processor to:

transmit live video content to a remote device; and provide real-time, two-way audio communication between the remote device and a user of the home automation system, wherein the real-time, two-way audio communication is tested and confirmed prior to transmitting or receiving audio messages associated with the real-time, two-way audio communication.

15. The apparatus of claim 14, wherein the real-time, two-way audio communication occurs concurrently with transmitting the live video content.

16. The apparatus of claim 14, wherein the instructions are executable by the processor to:

collect the live video content with a camera of the home automation system.

17. The apparatus of claim 14, wherein the home automation system includes at least one speaker and at least one microphone configured to provide the real-time audio communications from a user of the home automation system.

18. The apparatus of claim 16, wherein the camera comprises a microphone and a speaker.

19. The apparatus of claim 14, wherein the video content and audio communication are routed through a control panel of the home automation system.

* * * * *